United States Patent
Matsuda et al.

(10) Patent No.: US 6,364,611 B1
(45) Date of Patent: Apr. 2, 2002

(54) HELICOPTER POWER TRANSMITTING APPARATUS

(75) Inventors: Hidemi Matsuda, Tochigi-Ken; Hideteru Yamamoto, Utsunomiya, both of (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/132,679

(22) Filed: Aug. 12, 1998

(30) Foreign Application Priority Data

Aug. 14, 1997 (JP) ............................................. 9-219570

(51) Int. Cl.[7] .......................... A47C 21/04; B63H 1/00; F16H 57/00
(52) U.S. Cl. ...................................... 416/170 R; 74/410
(58) Field of Search .......................... 416/170 R, 122, 416/123; 74/410

(56) References Cited

U.S. PATENT DOCUMENTS

| | | | | |
|---|---|---|---|---|
| 1,351,319 A | * | 8/1920 | Alquist | 74/410 |
| 1,357,674 A | * | 11/1920 | Alquist | 74/410 |
| 1,359,853 A | * | 11/1920 | Wilkinson | 74/410 |
| 1,459,964 A | * | 6/1923 | Alqist | 74/410 |
| 1,632,543 A | * | 6/1927 | Fletcher, Jr. et al. | 74/410 |
| 2,823,558 A | * | 2/1958 | Semar et al. | 74/410 X |
| 3,338,109 A | * | 8/1967 | Forsyth et al. | 74/410 |
| 3,397,591 A | * | 8/1968 | Delescluse | 74/410 |
| 3,685,368 A | * | 8/1972 | Thoma | 74/410 |
| 4,272,041 A | * | 6/1981 | Mabuchi et al. | 416/123 X |
| 4,361,058 A | * | 11/1982 | Witt | 74/410 X |
| 4,429,586 A | * | 2/1984 | Dopfer et al. | 74/410 X |
| 4,447,023 A | * | 5/1984 | Reid | 74/410 X |
| 4,479,619 A | * | 10/1984 | Saunders et al. | 74/410 X |
| 4,489,625 A | * | 12/1984 | White | 74/410 |
| 5,472,386 A | * | 12/1995 | Kish | 416/170 R X |

FOREIGN PATENT DOCUMENTS

JP 7-285498 10/1995

\* cited by examiner

Primary Examiner—John E. Ryznic
(74) Attorney, Agent, or Firm—Smith, Gambrell & Russell, LLP (57) ABSTRACT

The disclosed helicopter power transmitting apparatus can transmit rotational torque of one engine input to a largediameter gear (3) linked with a main rotor driving shaft (2) through a pair of gear trains securely and uniformly. The helicopter power transmitting apparatus comprises a large-diameter gear (3); first and second smalldiameter gears (4a, 4b) both having the same diameter and the same number of teeth in mesh with the largediameter gear; a first largediameter helical gear (6a) linked with the first smalldiameter gear (4a) via a first shaft (5a) over the first smalldiameter gear (4a); a second largediameter helical gear (6b) linked with the second smalldiameter gear (4b) via a second shaft (5b) under the second smalldiameter gear (4b); an input shaft (7) arranged roughly in parallel to the first and second shafts (5a, 5b); an outer cylinder (8) slidably fitted to an outside of the input shaft (7); and first and second small-diameter helical gears (9, 9') fixed to both upper and lower ends of the outer cylinder in mesh with the first and second largediameter helical gears (6a, 6b), respectively. In particular, the first and second shafts (5a, 5b) have such flexural rigidity relationship as to substantially eliminate a phase difference between the first and second smalldiameter gears (4a, 4b), against the unbalanced forces applied to the first and second shafts (5a, 5b), respectively when the first and second smalldiameter gears (4a, 4b) transmit the same torque to the largediameter gear (3).

10 Claims, 5 Drawing Sheets

HELICOPTER POWER TRANSMITTING APPARATUS

BACKGROUND OF THE INVENTION

1. Field of the Invention

The present invention relates to a helicopter power transmitting apparatus for transmitting torque generated by a helicopter engine to a main rotor, etc., and more specifically to a power transmitting apparatus for transmitting engine rotational torque to the main rotor through a single input gear shaft in mesh with a plurality of gear trains uniformly, where the torque is equally transmitted to each gear trains, in order to reduce the weight and size of the apparatus.

2. Description of the Prior Art

Figure 7:
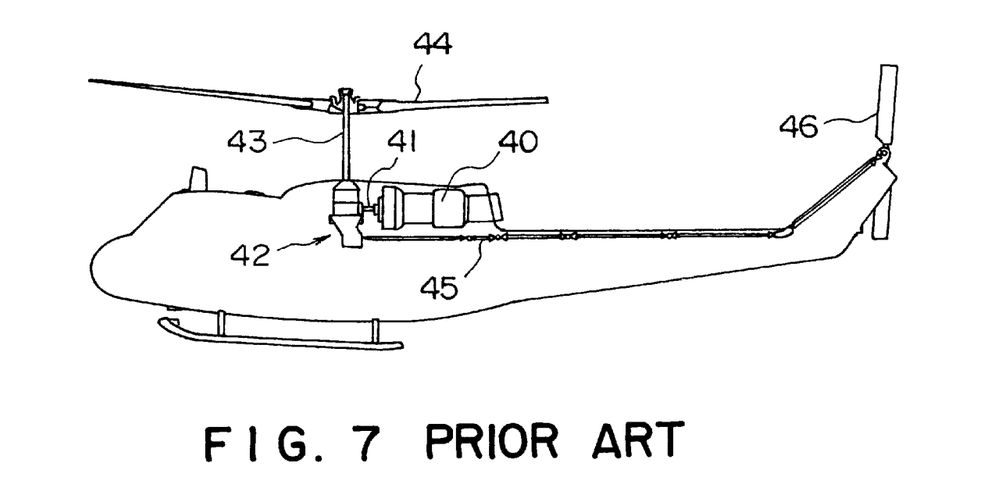
FIG. 7 is an illustration for explaining the conventional helicopter power transmitting apparatus.

The helicopter power transmitting apparatus is an apparatus for transmitting a rotational torque generated by a helicopter engine to a main rotor, a tail rotor, an electric dynamo, a hydraulic pump, etc., whose arrangement on a helicopter is shown in FIG. 7. In FIG. 7, an output shaft 41 of an engine 40 is linked with a power transmitting apparatus 42, and a drive shaft 43 extending from the power transmitting apparatus 42 drives a main rotor 44. In addition, a tail rotor drive shaft 45 extends from the power transmitting apparatus 42 to drive a tail rotor 46.

In the helicopter power transmitting apparatus of the above-mentioned prior art, since both light-weight and small-size characteristics are severely required, it is effective to adopt such a construction that double gear trains are provided for a single input shaft linked with an engine output shaft so that the engine rotational torque can be transmitted to a large-diameter gear for driving the main rotor through a pair of gear trains, as disclosed by a document "A 2400 Kw Light Weight Helicopter Transmission with Split-Torque Gear Trains": ASME 84-DET-91. In this prior art, the helicopter power transmitting apparatus is such that the rotational torque applied to a single input shaft is transmitted to a large-diameter main rotor driving gear through the pair of the gear trains, since there inevitably exist some manufacturing tolerance, shaft deformation, etc., it has been difficult to uniformly transmit the rotational torque to the main rotor through the pair of the gear trains as expected.

With respect to this apparatus, a related art already filed in Japan by the same Applicant as Japanese Patent Application No. 6-80475 will be first explained with reference to FIG. 8, in which the helicopter power transmitting apparatus is provided with the pair of the gear trains for automatically distributing the rotational engine torque uniformly.

Figure 8:
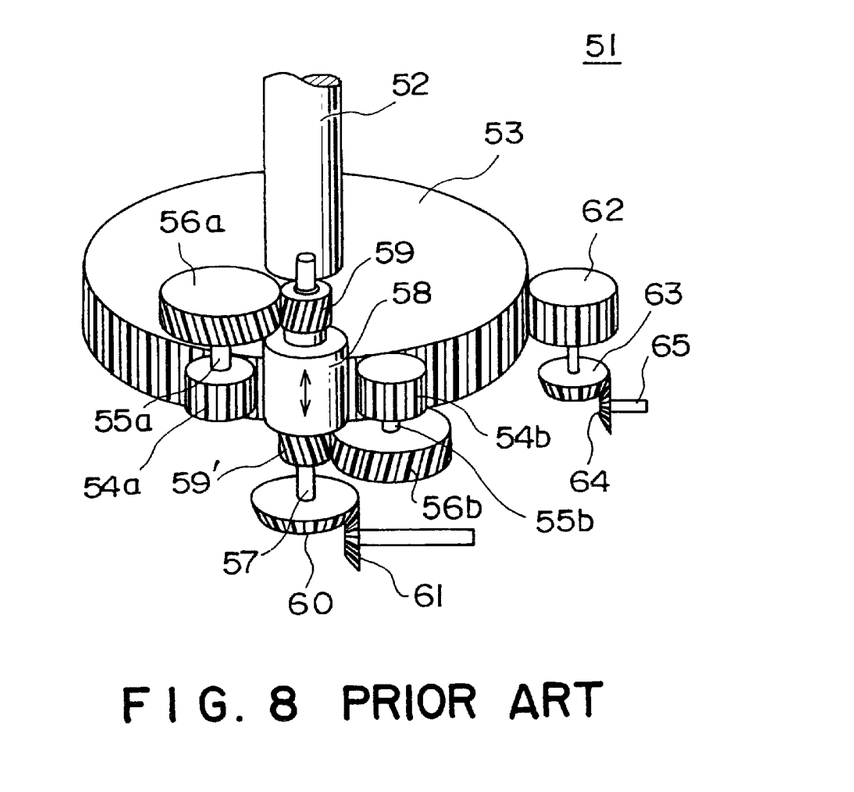
FIG. 8 is a perspective view showing a related prior art of the helicopter power transmitting apparatus already filed in Japan by the same Applicant.

As shown in FIG. 8, in this helicopter power transmitting apparatus 51, a largediameter gear 53 is directly linked with a main rotor drive shaft 52. This largediameter gear 53 is in mesh with a pair of first and second small-diameter gears 54a and 54b having the same diameter and the same number of teeth and arranged at a predetermined angular interval.

A first largediameter helical gear 56a is linked with the upper side of a first shaft 55a of the first small-diameter gear 54a. Further, a second largediameter helical gear 56b is fixed to the lower side of a second shaft 55b of the second smalldiameter gear 54b. The first largediameter helical gear 56a and the second largediameter helical gear 56b are the same diameter and the number of teeth, but opposite to each other in the inclination direction of the helical gear, so that the thrust directions generated by the two largediameter helical gears 56a and 56b are determined opposite to each other.

An input shaft 57 is arranged between the two first and second shafts 55a and 55b roughly in parallel to the two shafts 55a and 55b. Further, an outer cylinder 58 is arranged so as to be axially and slidably fitted to the outer side of the input shaft 57. Further, a first smalldiameter helical gear 59 in mesh with the first largediameter helical gear 56a and a second small-diameter helical gear 59' in mesh with the second largediameter helical gear 56b are arranged on the upper and lower ends of the outer cylinder 58, respectively.

The first smalldiameter helical gear 59 and the second smalldiameter helical gear 59' are the same in diameter and the number of teeth, but opposite to each other in the inclination direction of the helical gear, so that the thrust directions generated by the two smalldiameter helical gears 59 and 59' are determined opposite to each other.

Further, on the lower end of the input shaft 57, two bevel gears 60 and 61 are arranged to transmit the rotational torque generated by the engine to the power transmitting apparatus 51. In addition, a gear 62 is in mesh with the largediameter gear 53, to drive a tail rotor drive shaft 65 through two bevel gears 63 and 64.

In the above-mentioned conventional helicopter power transmitting apparatus 51, the rotational torque applied to the input shaft 57 is transmitted to the largediameter gear 53 via two transmission routes. That is, the first transmission route is to transmit the rotational torque of the input shaft 57 to the largediameter gear 53 by way of the outer cylinder 58, the first smalldiameter helical gear 59, the first largediameter helical gear 56a, and the first small-diameter gear 54a. Further, the second transmission route is to transmit the rotational torque of the input shaft 57 to the largediameter gear 53 by way of the outer cylinder 58, the second smalldiameter helical gear 59', the second largediameter helical gear 56b, and the second smalldiameter gear 54b. Therefore, the outer cylinder 58 is so constructed as to be slidable according to a difference between two thrust forces of mutually opposite directions generated by the first and second smalldiameter helical gears 59 and 59', respectively. Here, since the phase difference between the first and second smalldiameter helical gears 59 and 59' can be eliminated by the vertical slidable motion of the outer cylinder 58, it is possible to transmit the rotational torque uniformly through the two transmission routes.

In the above-mentioned helicopter power transmitting apparatus, however, as far as the rotational torque to be transmitted is small, since the outer cylinder can be well slid up and down, the rotational torque can be distributed uniformly. However, once the rotational torque exceeds a predetermined value, since a frictional force between the outer cylinder 58 and the input shaft 57 increases, the outer cylinder 58 cannot slide. Therefore, when the load of the helicopter is large, there exists a problem in that the rotational torques transmitted from the first and second small-diameter gears 54a and 54b to the largediameter gear 53, respectively are not well balanced.

To overcome the above-mentioned problem, although the non-slidable condition due to increased friction of the outer cylinder may be somewhat improved by using a ball-splined joint structure such that balls intervene between the input shaft and the outer cylinder, there arises another problem in that the apparatus is rather complicated and thereby becomes costly.

Therefore, the object of the present invention is to provide the helicopter power transmitting apparatus which can transmit the engine input to the main rotor, etc. through the pair of the gear trains securely and smoothly, in spite of a simple construction.

SUMMARY OF THE INVENTION

With these problems in mind, therefore, it is the object of the present invention to provide a helicopter power transmitting apparatus of a simple construction, which can securely and uniformly transmit an engine output power to a main rotor, etc. through a pair of gear trains.

To achieve the above-mentioned object, the first aspect of the present invention provides a helicopter power transmitting apparatus including: a largediameter gear (3) linked with a main rotor driving shaft (2); first and second smalldiameter gears (4a, 4b) both having the same diameter and the same number of teeth and arranged at a predetermined angular interval in mesh with said largediameter gear, respectively; a first largediameter helical gear (6a) linked with said first smalldiameter gear (4a) via a first shaft (5a) over said first smalldiameter gear (4a); a second largediameter helical gear (6b) linked with said second smalldiameter gear (4b) via a second shaft (5b) under said second smalldiameter gear (4b), both the first and second largediameter helical gears (6a, 6b) having the same diameter and the same number of teeth but opposite tooth inclination direction with respect to each other; an input shaft (7) arranged in parallel to the first and second shafts (5a, 5b), to transmit rotational torque generated by an engine; an outer cylinder (8) fitted to an outside of said input shaft (7), slidably in axial direction of said input shaft (7); and first and second smalldiameter helical gears (9, 9') fixed to both upper and lower ends of said outer cylinder in mesh with said first and second largediameter helical gears (6a, 6b), respectively, wherein said first and second shafts (5a, 5b) have such flexural rigidity relationship as to substantially eliminate a phase difference between the first and second smalldiameter gears (4a, 4b), against unbalanced forces applied to said first and second shafts (5a, 5b), respectively when said first and second smalldiameter gears (4a, 4b) transmit the same torque to said largediameter gear (3).

Further, the first aspect of the present invention provides a helicopter power transmitting apparatus including: a largediameter gear (3) linked with a main rotor driving shaft (2); first and second smalldiameter gears (4a, 4b) both having the same diameter and the same number of teeth and arranged at a predetermined angular interval and brought into mesh with said largediameter gear (3) in sequence along rotational direction of said largediameter gear (3), respectively; a first largediameter helical gear (6a) linked with said first smalldiameter gear (4a) via a first shaft (5a) over or under said first smalldiameter gear (4a); a second largediameter helical gear (6b) linked with said second smalldiameter gear (4b) via a second shaft (5b) over or under second smalldiameter gear (4b) on opposite side to said first largediameter gear (6a), both the first and second largediameter helical gears (6a, 6b) having the same diameter and the same number of teeth but opposite tooth inclination direction with respect to each other; an input shaft (7) arranged in parallel to the first and second shafts (5a, 5b) to transmit rotational torque generated by an engine; an outer cylinder (8) fitted to an outside of said input shaft (7) and arranged in axial direction of said input shaft; and first and second smalldiameter helical gears (9, 9') fixed to both upper and lower ends of said outer cylinder in mesh with said first and second largediameter helical gears (6a, 6b), respectively, wherein said first shafts (5a) has a flexural rigidity higher than that of said second shaft (5b).

Here, it is preferable that said input shaft (7) is provided with splines on an outer circumferential surface thereof, and said outer cylinder (8) is axially and slidably fitted to the splines of said input shaft.

Further, the second aspect of the present invention provides a helicopter power transmitting apparatus including: a largediameter gear (3) linked with a main rotor driving shaft (2); first and second smalldiameter gears (4a, 4b) both having the same diameter and the same number of teeth and arranged at a predetermined angular interval and brought into mesh with said largediameter gear in sequence along rotational direction of said large-diameter gear, respectively; a first largediameter helical gear (6a) linked with said first smalldiameter gear (4a) via a first shaft (5a) over or under said first smalldiameter gear (4a); a second largediameter helical gear (6b) linked with said second smalldiameter gear (4b) via a second shaft (5b) over or under said second smalldiameter gear (4b) on opposite side to said first largediameter gear (6a), both the first and second largediameter helical gears (6a, 6b) having the same diameter and the same number of teeth but opposite tooth inclination direction with respect to each other; a third shaft (21) arranged between and roughly in parallel to the first and second shafts (5a, 5b), slidably in axial direction thereof; first and second smalldiameter helical gears (9, 9') fixed to upper and lower ends of said third shaft (21) in mesh with said first and second largediameter helical gears (6a, 6b), respectively; and an input shaft (7) linked with an end of said third shaft (21) in the vicinity of said first largediameter helical gear (6a) to transmit rotational torque generated by an engine, via a slidable joint (22) for allowing axial movement of said third shaft (21) and for transmitting torque.

Here, it is preferable that said third shaft (21) has such a torsional rigidity as to substantially eliminate a phase difference between the first and second smalldiameter gears (4a, 4b), against unbalanced forces applied to said first and second shafts (5a, 5b), respectively when said first and second smalldiameter gears (4a, 4b) transmit the same torque to said largediameter gear (3).

Further, it is preferable that the slidable joint (22) includes an end of said third shaft (21) formed with splines on an outer circumferential surface thereof, and an end of said input shaft (7) formed with a shape fitted to the splines of the end of said third shaft (21) to allow axial movement of said third shaft.

Further, the third aspect of the present invention provides a helicopter power transmitting apparatus including: a largediameter gear (3) linked with a main rotor driving shaft (2); first and second smalldiameter gears (4a, 4b) both having the same diameter and the same number of teeth and arranged at a predetermined angular interval and brought into mesh with said largediameter gear in sequence along rotational direction of said largediameter gear; a first largediameter helical gear (6a) linked with said first smalldiameter gear (4a) via a first shaft (5a) over or under said first smalldiameter gear (4a); a second largediameter helical gear (6b) linked with said second smalldiameter gear (4b) via a second shaft (5b) longer than said first shaft (5a) over or under said second smalldiameter gear (4b) on the same side as said first largediameter gear (6a), both the first and second largediameter helical gears (6a, 6b) having the same diameter and the same number of teeth but opposite tooth inclination direction with respect to each other; a third shaft (31) arranged in parallel to said first and second shafts (5a, 5b) in axial direction thereof; first and second smalldiameter helical gears (9, 9') fixed to upper and lower ends of said third shaft (31) in mesh with said first and second largediameter helical gears (6a, 6b), respectively; and an input shaft (7) linked with an end of said third shaft (31) in the vicinity of said first largediameter helical gear (6a) to transmit rotational torque generated by an engine via a slidable joint (32) for allowing axial movement of said third shaft (31) and for transmitting torque.

Here, it is preferable that said first and second shafts (5a, 5b) have such flexural rigidity relationship as to substantially eliminate a phase difference between the first and second smalldiameter gears (4a, 4b), against unbalanced forces applied to said first and second shafts (5a, 5b), respectively when said first and second smalldiameter gears (4a, 4b) transmit the same torque to said largediameter gear (3); and further said third shaft (31) has such a torsional rigidity as to substantially eliminate the phase difference between the first and second smalldiameter gears (4a, 4b) when said first and second smalldiameter gears (4a, 4b) transmit the same torque to said largediameter gear (3).

Further, it is preferable that the slidable joint (32) includes an end of said third shaft (31) formed with splines on an outer circumferential surface thereof, and the end of said input shaft (7) formed with a shape fitted to the splines of the end of said third shaft (31) to allow axial movement of said third shaft.

In the helicopter power transmitting apparatus according to the present invention, since the flexural rigidity and the torsional rigidity of the first shaft (5a), the second shaft (5b) and the third shaft (31) are respectively adjusted appropriately, it is possible to uniformly distribute the rotational torques transmitted by the first and second smalldiameter gears (4a) and (4b) to the large-diameter gear (3), respectively without changing or without complicating the composing elements of the helicopter power transmitting apparatus.

DETAILED DESCRIPTION OF THE PREFERRED EMBODIMENTS

The embodiments of the present invention will be described in detail hereinbelow with reference to the attached drawings.

The arrangement of the helicopter power transmitting apparatus on a helicopter according to the present invention is basically the same as the conventional one explained with reference to FIG. 7.

[1st embodiment]

A first embodiment according to the present invention will be described hereinbelow with reference to FIG. 1.

The helicopter power transmitting apparatus 1 of the first embodiment comprises a largediameter gear 3 directly linked with a drive shaft 2 of a main rotor; a first smalldiameter gear 4a and a second smalldiameter gear 4b both having the same diameter and the same number of teeth and arranged at a predetermined angular interval in mesh with the largediameter gear 3, respectively; a first largediameter helical gear 6a linked with the first smalldiameter gear 4a via a first shaft 5a over the first smalldiameter gear 4a; a second largediameter helical gear 6b linked with a second smalldiameter gear 4b via a second shaft 5b under the second smalldiameter gear 4b; an input shaft 7 arranged in parallel to the two first and second shafts 5a and 5b; an outer cylinder 8 fitted to the outside of the input shaft 7 so as to be slidable in the axial direction of the input shaft 7; and a first smalldiameter helical gear 9 and a second smalldiameter helical gear 9' fixed to the upper and lower ends of the outer cylinder 8 in mesh with the first largediameter helical gear 6a and the second largediameter helical gear 6b, respectively.

Further, the first largediameter helical gear 6a and the second largediameter helical gear 6b are the same in diameter and the number of teeth, but opposite to each other in the inclination direction of the helical gear. Therefore, the first smalldiameter helical gear 9 in mesh with the first large diameter helical gear 6a and the second smalldiameter helical gear 9' in mesh with the largediameter helical gear 6b are also the same in diameter and the number of teeth, but opposite to each other in the inclination direction of the helical gear.

Further, although being not the composing elements of the power transmission apparatus according to the present invention, a pair of bevel gears 10 and 11 are arranged on the lower end of the input shaft 7, so that the input shaft 7 is connected to an output shaft of an engine. Further, the largediameter gear 3 is in mesh with a tail rotor gear 12 via a shaft 13 and a pair of bevel gears 14 and 15 in order to transmit power to a tail rotor.

Figure 1:
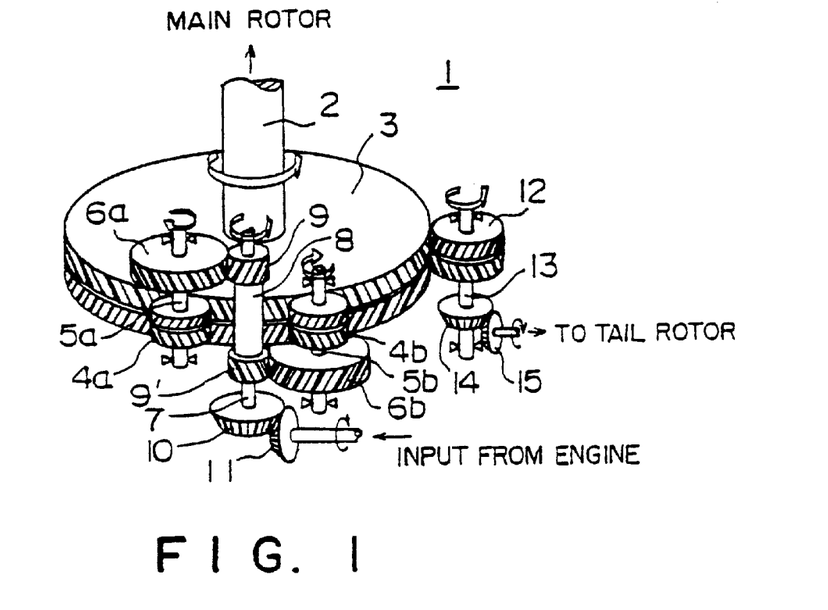
FIG. 1 is a perspective view showing a construction of a first embodiment of the helicopter power transmitting apparatus according to the present invention.

Further, in FIG. 1, although the largediameter gear 3, the first smalldiameter gear 4a, the second smalldiameter gear 4b, and the tail rotor gear 12 are all shown so as to construct a double helical gear, respectively, these gears can be replaced with a gear of another type (e.g., a spur gear), respectively, as far as the power can be transmitted. The same as above can be applied to the other embodiments of the present invention, described later.

Figure 2:
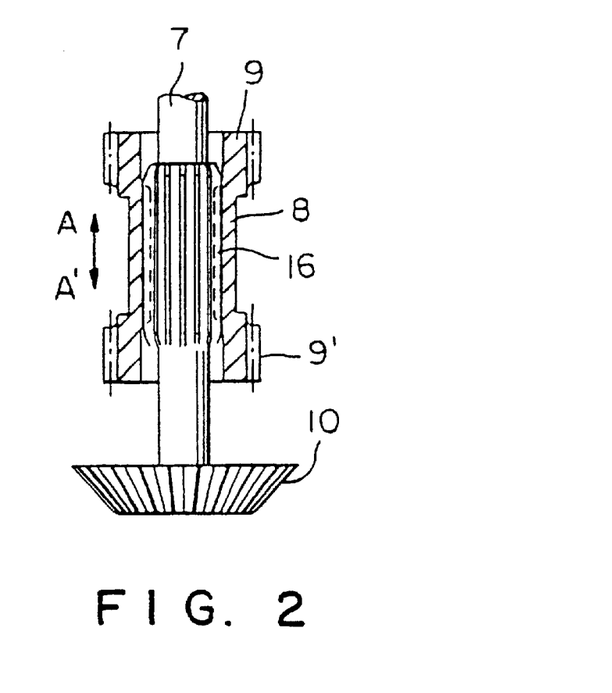
FIG. 2 is a longitudinal cross-sectional view showing an outer cylinder and an input shaft of the first embodiment of the helicopter power transmitting apparatus according to the present invention.

The outer cylinder 8 is constructed in such a way to be slidably fitted to the outer side of the input shaft 7 in the axial direction of the input shaft 7. To realize this construction, it is possible to form both the cross sections of the outer circumferential surface of the input shaft 7 and the inner circumferential surface of the outer cylinder 8 into polygonal shape, or else to provide at least one fitting key between both the circumferential surfaces thereof. However, as with the case of the first embodiment, it is preferable to provide splines on the outer circumferential surface of the input shaft 7 so as to be fitted to the inner circumferential surface of the outer cylinder 8. FIG. 2 is a cross-sectional view showing the spline structure of this first embodiment.

As shown in FIG. 2, the outer circumferential surface of the input shaft 7 is formed with some splines 16, and the inner circumferential surface of the outer cylinder 8 is formed with some grooves fitted to the splines 16. Owing to the structure as described above, the outer cylinder 8 can be rotated together with the input shaft 7 and further slid in the axial (A–A') direction of the input shaft 7. Further, as shown in FIG. 2, since the first and second smalldiameter helical gears 9 and 9' are fixed to the upper and lower ends of the outer cylinder 8, whenever the outer cylinder 8 is slid along the input shaft 7, both the first and second smalldiameter helical gears 9 and 9' can be slid in the same direction over the same axial distance.

In the above-mentioned helicopter power transmitting apparatus 1, the rotational torque generated by an engine is transmitted, as shown by arrows in FIG. 1, from the input shaft 7 to the largediameter gear 3 by way of the outer cylinder 8, the first and second smalldiameter helical gears 9 and 9', the first and second largediameter helical gears 6a and 6b, and the first and second smalldiameter gears 4a and 4b. The rotation of the largediameter gear 3 is transmitted to the main rotor via the main rotor drive shaft 2, and further to the tail rotor via the tail rotor gear 12 and the two bevel gears 14 and 15.

In the construction of the mechanical composing elements of the first embodiment of the helicopter power transmitting apparatus according to the present invention, the feature thereof resides in the flexural rigidity relationship between the first shaft 5a and the second shaft 5b. In more detail, the feature of this first embodiment resides in that the first shaft 5a and the second shaft 5b have such flexural rigidity relationship as to substantially eliminate a phase difference between the first smalldiameter gear 4a and the second smalldiameter gear 4b, against the unbalanced forces applied to both the first and second shafts 5a and 5b, respectively when the first smalldiameter gear 4a and the second smalldiameter gear 4b transmit the same torque to the largediameter gear 3.

Figure 3A:
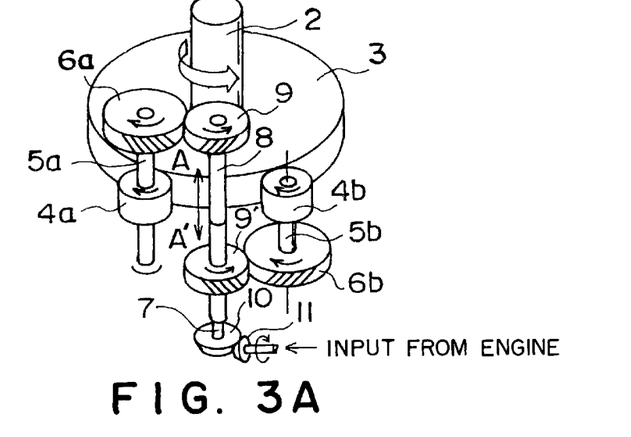
FIG. 3A is a perspective view for explaining the state in which the power transmitting apparatus transmits the rotational torque generated by an engine.
Figure 3B:
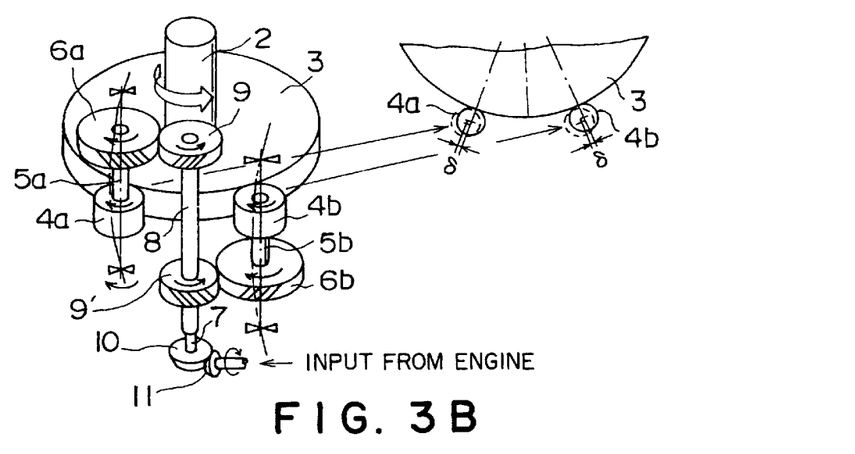
FIG. 3B is a perspective view for explaining the state in which a frictional force between an outer cylinder and an input shaft increases with an increase of an engine torque and thereby the outer cylinder cannot be sufficiently slid in the vertical direction, with the result that the first and second shafts are bent.
Figure 3C:
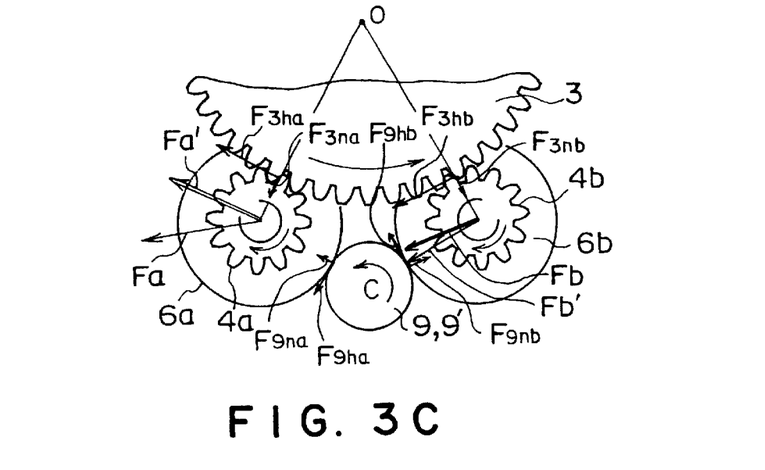
FIG. 3C is a perspective view for explaining various forces applied to the gears and shafts, when the first and second smalldiameter gears transmit the same torque to the largediameter gears.

FIGS. 3A to 3C show the bending conditions, the rotational torques, and the reaction forces of both the first and second shafts 5a and 5b, which are all obtained when the helicopter power transmitting apparatus according to -the present invention transmits power. In more detail, FIG. 3A shows the state where the rotational torque generated by the engine is being transmitted, in which the rotational torque of the input shaft 7 is transmitted to the largediameter gear 3 via two transmission routes. In one route, the torque is transmitted from the input shaft 7 to the largediameter gear 3 by way of the first smalldiameter helical gear 9, the first largediameter helical gear 6a, and the first smalldiameter gear 4a. Further, in the other route, the torque is transmitted from the input shaft 7 to the largediameter gear 3 by way of the second smalldiameter helical gear 9', the second largediameter helical gear 6b, and the second smalldiameter gear 4b.

Here, since the teeth inclination directions of both the first and second smalldiameter helical gears 9 and 9' are opposite to each other and further since the outer cylinder 8 is arranged so as to be slidable up and down, as far as the helicopter load is low, even if there exists a difference in the transmitted torque between the first and second smalldiameter helical gears 9 and 9', the outer cylinder 8 can be slidably moved up and down (in the A–A' direction) and thereby the phase difference between the first and second smalldiameter helical gears 9 and 9' can be absorbed, with the result that it is possible to well equalize two torques transmitted through both the first and second smalldiameter helical gears 9 and 9'.

On the other hand, however, when the helicopter load is high beyond a predetermined value, since the friction force between the input shaft 7 and outer cylinder 8 increases with increasing the engine torque, the outer cylinder 8 cannot be slidably moved up and down smoothly.

FIG. 3B shows the bending conditions of both the first and second shafts 5a and 5b under these conditions. As shown in FIG. 3B, when power is being transmitted, the first shaft 5a receives a reaction force generated by the gearing between the first largediameter helical gear 6a and the first smalldiameter helical gear 9 and between the first smalldiameter gear 4a and the largediameter gear 3. As a result, as shown by phantom lines (dashed lines) in FIG. 3B, the first shaft 5a is bent into a curved shape. The same is applied to the second shaft 5b. In more detail, since the second shaft 5b receives a reaction force generated by the gearing between the second largediameter helical gear 6b and the second smalldiameter helical gear 9' and between the second smalldiameter gear 4b and the largediameter gear 3, as shown by phantom lines (dashed lines) in FIG. 3B, the second shaft 5b is also bent into a curved shape.

As the result that the first and second shafts 5a and 5b are bent, when seen from above, the first and second smalldiameter gears 4a and 4b are displaced as shown on the right side in FIG. 3B. Here, since being in mesh with the largediameter gear 3, the first and second smalldiameter gears 4a and 4b are both displaced at the same angular distance δ, respectively along the circumferential direction of the largediameter gear 3.

Here, when the first and second shafts 5a and 5b are the same in flexural rigidity with respect to each other, since the first and second smalldiameter gears 4a and 4b are equally displaced as already explained, a torque transmitted from the first smalldiameter gear 4a to the largediameter gear 3 is not well balanced with the torque transmitted from the second smalldiameter gear 4b to the same largediameter gear 3. In the power transmitting apparatus according to the present invention, however, since the rigidities of the first shaft 5a and the second shaft 5b are so determined as to be different from each other, even if the first and second smalldiameter gears 4a and 4b are displaced at the same angular distance.

It is possible to transmit the same torque from the first smalldiameter gear 4a and the second smalldiameter gear 4b to the same largediameter gear 3, respectively. The reason why the same torque can be transmitted will be explained further in detail with reference to FIG. 3(c).

FIG. 3C shows the various forces applied to the gears and the shafts of the power transmitting apparatus according to the present invention, when the same torque is being transmitted from the first and second smalldiameter gears 4a and 4b to the largediameter gear 3, respectively.

In FIG. 3C, various forces are:

$F_{3ha}$: reaction force of first shaft 5a in circumferential direction of largediameter gear 3, which is applied by largediameter gear 3

$F_{3na}$: reaction force of first shaft 5a in radial direction of largediameter gear 3, which is applied by largediameter gear 3

$F_{9ha}$: reaction force of first shaft 5a in circumferential direction of first smalldiameter helical gear 9, which is applied by smalldiameter helical gear 9

$F_{9na}$: reaction force of first shaft 5a in radial direction of first smalldiameter helical gear 9, which is applied by smalldiameter helical gear 9

$F_a$: $F_{3ha}+F_{3na}+F_{9ha}+F_{9na}$, which is a resultant force of all reaction forces applied to first shaft 5a
$F'_a$: component of $F_a$ in circumferential direction of largediameter gear 3
$F_{3hb}$: reaction force of second shaft 5b in circumferential direction of largediameter gear 3, which is applied by largediameter gear 3
$F_{3nb}$: reaction force of second shaft 5b in radial direction of largediameter gear 3, which is applied by largediameter gear 3
$F_{9hb}$: reaction force of second shaft 5b in circumferential direction of second smalldiameter helical gear 9', which is applied by second smalldiameter helical gear 9'
$F_{9nb}$: reaction force of second shaft 5b in radial direction of second smalldiameter helical gear 9', which is applied by second smalldiameter helical gear 9'
$F_b$: $F_{3hb}+F_{3nb}+F_{9hb}+F_{9nb}$, which is a resultant force of all reaction forces applied to second shaft 5b
$F'_b$: component of $F_b$ in circumferential direction of largediameter gear 3

Here, since the torque is transmitted from the first and second smalldiameter gears 4a and 4b to the largediameter gear 3, respectively, the mutual relationship among $F_{3ha}$, $F_{3hb}$, $F_{3na}$, $F_{3nb}$, $F_{9ha}$, $F_{9hb}$, $F_{9na}$, $F_{9nb}$ are as follows:

$|F_{3ha}|=|F_{3hb}|$
$|F_{3na}|=|F_{3nb}|$
$|F_{9ha}|=|F_{9hb}|$
$|F_{9na}|=|F_{9nb}|$

The relationship between the above-mentioned two resultant forces $F_a$ (=$F_{3ha}+F_{3na}+F_{9ha}+F_{9na}$) and $F_b$ (=$F_{3hb}+F_{3nb}+F_{9hb}+F_{9nb}$) is $|F_a|>|F_b|$ due to the influence the force directions. Accordingly, the relationship between $F_a'$ and $F_b'$ (which cause the displacements of the first and second smalldiameter gears 4a and 4b) is $|F_a'|>|F_b'|$.

In summary, in the power transmitting apparatus 1 according to the present invention, the first and second shafts 5a and 5b have such flexural rigidity relationship that both the first and second smalldiameter gears 4a and 4b can generate the same displacement, respectively, against the forces $F_a'$ and $F_b'$ having the relationship of $|F_a'|>|F_b'|$ when the first and second smalldiameter gears 4a and 4b are transmitting the same torque.

The above-mentioned relationship can be explained by a different point of view as follows: the flexural rigidities of the first and second shafts 5a and 5b decide the magnitudes of the reaction forces against the bending, and further the magnitudes of the reaction forces decide the magnitudes of the forces transmitted from the first and second smalldiameter gears 4a and 4b to the largediameter gear 3, respectively. In the present invention, since the flexural rigidity of the first shaft 5a is larger than that of the second shaft 5b, the resultant forces $F_a$ and $F_b$ of $|F_a'|>|F_b'|$, that is, $|F_a|>|F_b|$ are generated as the reaction forces against the same bending displacements. Here, these resultant forces $F_a$ and $F_b$ ($|F_a|>|F_b|$) have the force components of $F_{3ha}$ and $F_{3hb}$ ($|F_{3ha}|=|F_{3hb}|$) for transmitting the same rotational torque from the first and second smalldiameter gears 4a and 4b to the largediameter gear 3, respectively.

Further, any flexural rigidity of the first or second shaft 5a or 5b can be obtained by adjusting the length, the support position, the inner diameter, the outer diameter, etc. of the first or second shafts 5a or 5b appropriately.

Figure 4:
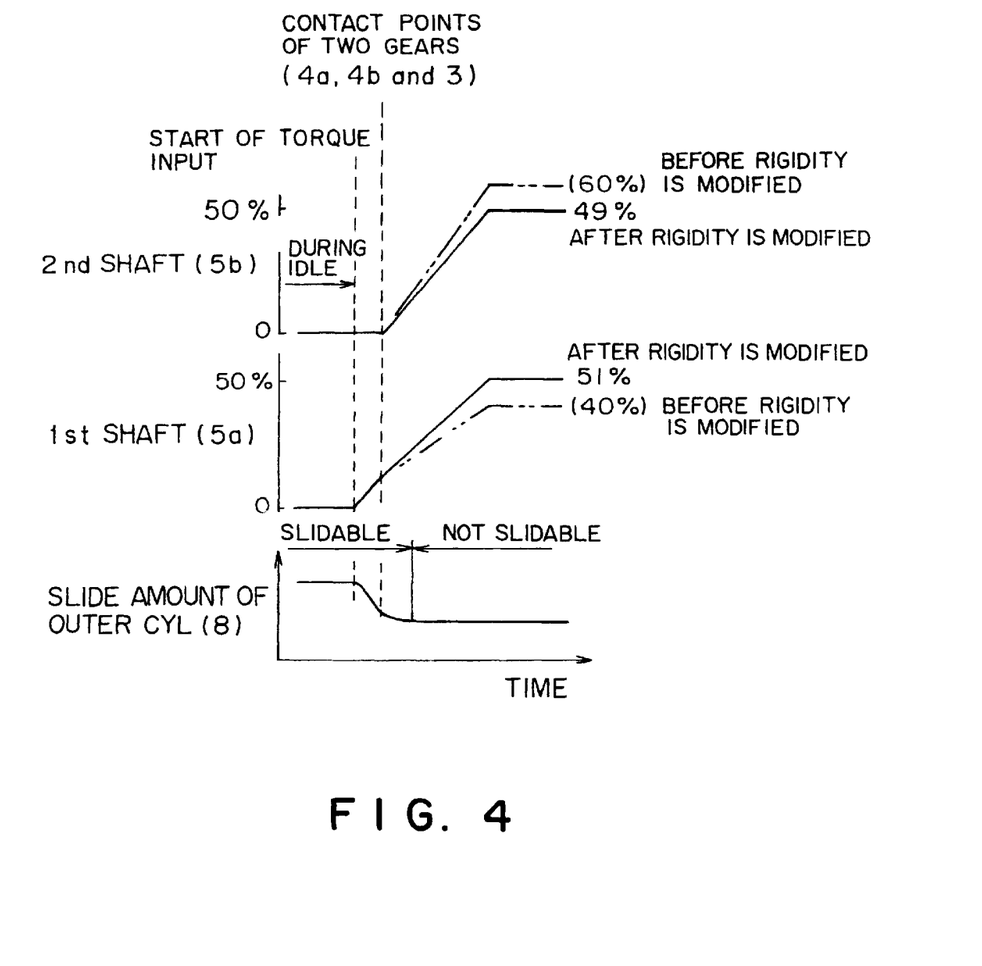
FIG. 4 is a graphical representation showing the variations of the torque distributions of the first and second shafts and the slide rate of the outer cylinder with the elapse of time.

FIG. 4 shows an actual example of the torque distribution of the first and second smalldiameter gears 4a and 4b, in comparison between before and after the first and second shafts 5a and 5b are modified.

In FIG. 4, the abscissa indicates the lapse of time, and the ordinate indicates the torque distribution of the second shaft 5b, the torque distribution of the first shaft 5a, and the slide rate of the outer cylinder 8 in sequence from above, respectively. As shown in FIG. 4, when the rotational torque generated by the engine increases and thereby the large torque is transmitted to the largediameter gear 3, at the beginning the first and second smalldiameter gears 4a and 4b rotate idle. However, when the first and second smalldiameter gears 4a and 4b are brought into mesh with the largediameter gear 3, respectively, the torque transmission begins and thereby the first and second smalldiameter gears 4a and 4b are in mesh with the largediameter gear 3, respectively at a time point. Further, when the helicopter load is small, since the outer cylinder 8 is slid up and down, although the rotational torque can be distributed uniformly, if the helicopter load increases beyond a predetermined value, the outer cylinder 8 cannot slide well.

Here, when the first and second shafts 5a and 5b are the same in flexural rigidity; that is, before modification of flexural rigidities of the first and second shafts 5a and 5b, as shown by dot-dot-dashed lines in FIG. 4, the first shaft 5a transmits 40% of the total torque to be transmitted, and the second shaft 5b transmits 60% of the total torque to be transmitted, respectively. However, in the present invention, since the rigidities of the first and second shafts 5a and 5b are appropriately adjusted, as shown by the solid line in FIG. 4, it is possible to obtain such conditions that the first shaft 5a transmits 51% of the total torque to be transmitted, and the second shaft 5b transmits 49% of the total torque to be transmitted, respectively. Further, in this case, the rigidity of the first shaft 5a is adjusted relatively large, and the rigidity of the second shaft 5b is adjusted relatively small.

As described above, in the present invention, it is possible to uniformly distribute the rotational torques transmitted by the first and second smalldiameter gears 4a and 4b to the largediameter gear 3, by adjusting the flexural rigidities of both the first and second shafts 5a and 5b, appropriately, without changing or without complicating the composing elements of the related helicopter power transmitting apparatus shown in FIG. 8.

Further, in this first embodiment, although the flexural rigidities of both the first and second shafts 5a and 5b are adjusted in such a way that the first and second smalldiameter gears 4a and 4b can transmit the same uniform torque, in general it is possible to improve the unbalanced condition of the transmission torques of the first and second smalldiameter gears 4a and 4b, by determining the flexural rigidity of the first shaft 5a to be larger than that of the second shaft 5b.

[2nd embodiment]

A second embodiment of the helicopter power transmitting apparatus according to the present invention will be described hereinbelow with reference to FIG. 5, in which the same reference numerals have been retained for similar parts or elements having the same functions as with the case of the first embodiment shown in FIG. 1.

Figure 5:
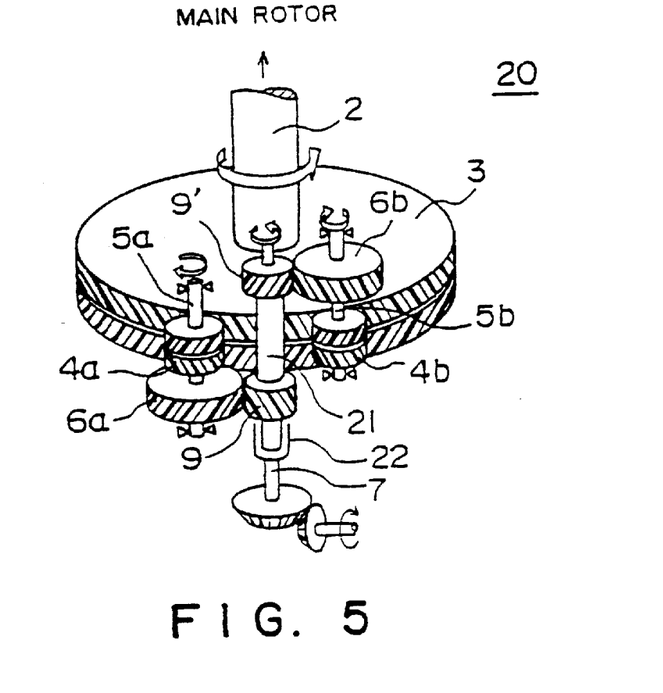
FIG. 5 is a perspective view showing a second embodiment of the helicopter power transmitting apparatus according to the present invention.

As shown in FIG. 5, a helicopter power transmitting apparatus 20 of the second embodiment comprises a largediameter gear 3 directly linked with a drive shaft 2 of a main rotor; a first smalldiameter gear 4a and a second smalldiameter gear 4b both having the same diameter and the same number of teeth and arranged at a predetermined angular interval in mesh with the largediameter gear 3, respectively in sequence along the rotational direction of the largediameter gear 3; a first largediameter helical gear 6a linked with the first smalldiameter gear 4a via a first shaft 5a under the first smalldiameter gear 4a; a second largediameter helical gear 6b linked with the second smalldiameter gear 4b via a second shaft 5b over the second smalldiameter gear 4b, both the first and second largediameter helical gears 6a and 6b having the same diameter and the same number of teeth but opposite tooth inclination direction with respect to each other; a third shaft 21 arranged in parallel to the first shaft 5a and the second shaft 5b and slidably in an axial direction of the first and second shafts 5a and 5b; a first smalldiameter helical gear 9 and a second smalldiameter helical gear 9' fixed to the upper and lower ends of the third shaft 21 in mesh with the first largediameter helical gear 6a and the second largediameter helical gear 6b, respectively; and an input shaft 7 linked with an end of the third shaft 21 in the vicinity of the first largediameter helical gear 6a to transmit rotational torque generated by the engine, via a slidable joint 22 for allowing an axial movement of the third shaft 22 and for transmitting torque.

In addition to the above-mentioned composing elements, the feature of the second embodiment of the power transmitting apparatus resides in that: the third shaft 21 has such a torsional rigidity as to roughly eliminate a phase difference between the first smalldiameter gear 4a and the second smalldiameter gear 4b, against the unbalanced forces applied to both the first and second shafts 5a and 5b, respectively when the first smalldiameter gear 4a and the second smalldiameter gear 4b transmit the same torque to the largediameter gear 3.

Further, in the second embodiment, the first largediameter helical gear 6a is arranged on the lower side of the first smalldiameter gear 4a; the second largediameter helical gear 6b is arranged on the upper side of the second smalldiameter gear 4b; and further the slidable joint 22 is arranged on the lower end of the third shaft 21. Without being limited only to the above-mentioned arrangement, any arrangement can be adopted, as far as the slidable joint 22 is arranged at an end of the third shaft 21 in the vicinity of the first smalldiameter gear 4a. For instance, when the first largediameter helical gear 6a is arranged on the upper side of the first smalldiameter gear 4a and the second largediameter helical gear 6b is arranged on the lower side of the second smalldiameter gear 4b, the slidable joint 22 is arranged on the upper end of the third shaft 21.

Further, the slidable joint 22 is preferably composed of an end portion of the third shaft 21 formed with splines on the outer circumferential surface thereof, and an end portion of the input shaft 7 formed with a shape fitted to the splines of the end portion of the third shaft 21 in such a way as to allow the axial movement of the third shaft 21.

In this second embodiment, the rotational torque generated by the engine is transmitted to the largediameter gear 3 via two transmission routes. That is, in the first transmission route, the rotational torque is transmitted from the input shaft 7 to the largediameter gear 3 by way of the first smalldiameter helical gear 9, the first largediameter helical gear 6a, and the first smalldiameter gear 4a. Further, in the second transmission route, the rotational torque is transmitted from the input shaft 7 to the largediameter gear 3 by way of the third shaft 21, the second smalldiameter helical gear 9', the second largediameter helical gear 6b, and the second smalldiameter gear 4b.

Since the first and second smalldiameter gears 4a and 4b are in mesh with the same largediameter gear 3 respectively, the same displacements are generated. In this case, the forces, that is, the rotational torques applied from the first and second smalldiameter gears 4a and 4b to the largediameter gear 3, respectively are decided on the basis of the rigidities of the element groups for constituting the first and second torque transmission routes.

In the power transmitting apparatus of this second embodiment, therefore, the rigidities of the element groups for constituting the first and second torque transmission routes are adjusted by adjusting the torsional rigidity of the third shaft 21, in such a way that when the first and second smalldiameter gears 4a and 4b generate the same displacement, the same rotational torque can be transmitted to the largediameter gear 3.

In the second embodiment of the helicopter power transmitting apparatus 20 according to the present invention, it is possible to uniformly distribute the two rotational torques transmitted by the first and second smalldiameter gears 4a and 4b, by adjusting the torsional rigidity of the third shaft 21 appropriately, without changing or without complicating the composing elements of the related helicopter power transmitting apparatus shown in FIG. 8.

Further, in general, when the rigidities against displacement of both the first and second smalldiameter gears 4a and 4b are equalized, the transmission torque of the first smalldiameter gear 4a becomes smaller than that of the second smalldiameter a gear 4b. Therefore, it is possible to improve the unbalanced condition of the transmission torque between the first and second smalldiameter gears 4a and 4b, by determining the rigidity against displacement of the first smalldiameter gear 4a to be larger than that of the second smalldiameter gear 4b.

In the construction of the second embodiment, since the input shaft 7 is connected to the end of the third shaft 21 in the vicinity of the first smalldiameter gear 4a, the rigidity against displacement of the first smalldiameter gear 4a is determined higher than that of the second smalldiameter gear 4b owing to the construction itself. Therefore, even if the rigidity of the third shaft 21 is not adjusted specially, it is possible to improve the unbalanced condition of the transmission torque between the first and second smalldiameter gears 4a and 4b.

[3nd embodiment]

A third embodiment of the helicopter power transmitting apparatus according to the present invention will be described hereinbelow with reference to FIG. 6, in which the same reference numerals have been retained for similar parts or elements having the same functions as with the case of the first embodiment shown in FIG. 1.

Figure 6:
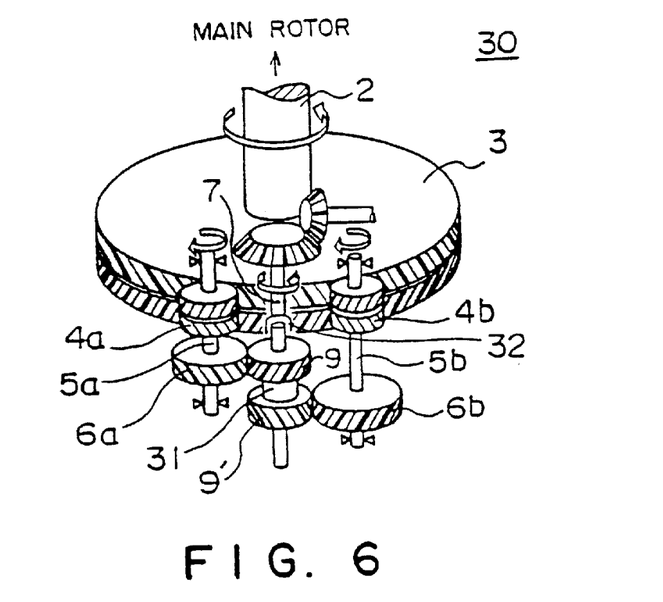
FIG. 6 is a perspective view showing a third embodiment of the helicopter power transmitting apparatus according to the present invention.

As shown in FIG. 6, a helicopter power transmitting apparatus 30 of this third embodiment comprises a largediameter gear 3 directly linked with a drive shaft 2 of a main rotor; a first smalldiameter gear 4a and a second smalldiameter gear 4b both having the same diameter and the same number of teeth and arranged a predetermined angular interval in mesh with the largediameter gear 3, respectively in sequence along the rotational direction of the largediameter gear 3; a first largediameter helical gear 6a linked with the first smalldiameter gear 4a via a first shaft 5a under the first smalldiameter gear 4a; a second largediameter helical gear 6b linked with the second smalldiameter gear 4b via a second shaft 5b longer than the first shaft 5a over the second smalldiameter gear 4b on the same side of the first largediameter gear 6a, both the first and second largediameter helical gears having the same diameter and the same number of teeth but opposite tooth inclination direction with respect to each other; a third shaft 31 arranged between and roughly in parallel to the first shaft 5a and the second shaft 5b roughly in parallel to the first and second shafts 5a and 5b, slidably in the axial direction of the first and second shafts 5a and 5b; a first smalldiameter helical gear 9 and a second smalldiameter helical gear 9' fixed to the upper and lower ends of the third shaft 31 in mesh with the first largediameter helical gear 6a and the second largediameter helical gear 6b, respectively; and an input shaft 7 linked with an end, that is, an upper end of the third shaft 31 in the vicinity of the first largediameter helical gear 6a to transmit the rotational torque generated by the engine, via a slidable joint 32 for allowing axial movement of the third shaft 31 and for transmitting torque.

In addition to the above-mentioned composing elements, the feature of the third embodiment of the power transmitting apparatus resides in that: the first and second shafts 5a and 5b have such flexural rigidity relationship as to roughly eliminate a phase difference between the first smalldiameter gear 4a and the second smalldiameter gear 4b, against the unbalanced forces applied to both the first and second shafts 5a and 5b, respectively when the first smalldiameter gear 4a and the second smalldiameter gear 4b transmit the same torque to the largediameter gear 3. Further, the third shaft 31 has such a torsional rigidity as to roughly eliminate the phase difference between the first and second smalldiameter gears 4a and 4b, when the first and second smalldiameter gears 4a and 4b transmit the same torque to the largediameter gear 3.

Further, in this third embodiment, although the first largediameter helical gear 6a and the second largediameter helical gear 6b are both arranged under the first smalldiameter gear 4a, without being limited only to the above-mentioned arrangement, it is possible to arrange the first and second largediameter gears 6a and 6b over the first smalldiameter gear 4a.

Further, the slidable joint 32 is preferably composed of an end portion of the third shaft 31 formed with splines on the outer circumferential surface thereof, and an end portion of the input shaft 7 formed with a shape fitted to the splines of the end of the third shaft 31 to allow the axial movement of the third shaft 31.

In this third embodiment, the rotational torque generated by the engine is transmitted to the largediameter gear 3 through two transmission routes. That is, in the first transmission route, the rotational torque is transmitted from the input shaft 7 to the largediameter gear 3 by way of the third shaft 31, the first smalldiameter helical gear 9, the first largediameter helical gear a, and the first smalldiameter gear 4a. Further, in the second transmission route, the rotational torque is transmitted from the input shaft 7 to the largediameter gear 3 by way of the second smalldiameter helical gear 91, the second largediameter helical gear 6b, and the second smalldiameter gear 4b.

Since the first and second smalldiameter gears 4a and 4b are in mesh with the same largediameter gear 3 respectively, the same displacements are generated. In this case, the forces, that is, the rotational torques applied from the first and second smalldiameter gears 4a and 4b to the largediameter gear 3, respectively are decided by the rigidities of the element groups for constituting the first and second torque transmission routes.

In the third embodiment of the power transmitting apparatus 30 according to the present invention, therefore, the rigidities of the element groups for constituting the first and second torque transmission routes are adjusted by adjusting both the flexural rigidity and the torsional rigidity of the first shaft Sa, the second shaft 5b and the third shaft 31, respectively in such a way that when the first and second smalldiameter gears 4a and 4b generate the same displacement, the same rotational torque can be transmitted to the largediameter gear 3.

In the third embodiment of the helicopter power transmitting apparatus 30 according to the present invention, it is possible to uniformly distribute the rotational torques transmitted by the first and second smalldiameter gears 4a and 4b to the largediameter gear 3, by adjusting the flexural rigidity and the torsional rigidity of the first shaft 5a, the second shaft 5b and the third shaft 31, appropriately, respectively without changing or without complicating the composing elements of the related helicopter power transmitting apparatus shown in FIG. 8.

Further, as already explained, in general it is possible to improve the unbalanced condition of the transmission torque between the first and second smalldiameter gears 4a and 4b, by determining the rigidity against displacement of the first smalldiameter gear 4a to be higher than that of the second smalldiameter gear 4b.

In contrast with this, in the construction of the third embodiment, since the second shaft 5b is determined to be longer than the first shaft Sa, the rigidity against displacement of the first smalldiameter gear 4a is determined higher than that of the second smalldiameter gear 4b owing to the construction itself. Therefore, even if the rigidities of the first shaft Sa, the second shaft 5b, and the third shaft 31 are not adjusted specially, it is possible to improve the unbalanced condition of the transmission torque between the first and second smalldiameter gears 4a and 4b.

As described above, in the helicopter power transmitting apparatus according to the present invention, in particular with respect to the first and second smalldiameter gears 4a and 4b in mesh with the largediameter gear 3 directly -linked with the main rotor drive shaft 2 of the helicopter in sequence along the rotational direction of the largediameter gear 3, since the rigidities of the mechanical composing element groups for supporting the first and second smalldiameter gears 4a and 4b, respectively are adjusted, in general in such a way that the rigidity of the mechanical element group for supporting the first smalldiameter gear 4a is determined to be larger than that of the second smalldiameter gear 4b, it is possible to improve the unbalanced condition between the first and second smalldiameter gears 4a and 4b in rotational torque transmitted to the largediameter gear 3. Further, preferably, it is possible to equalize the rotational torques transmitted from the first and second smalldiameter gears 4a and 4b to the largediameter gear 3, by adjusting the rigidities of the mechanical element groups for supporting the first and second smalldiameter gears 4a and 4b.

Therefore, in the helicopter power transmitting apparatus according to the present invention for transmitting one engine input to the main rotor through a plurality of gear trains, it is possible to provide a lightweight and smallsized helicopter power transmitting apparatus, which can uniformly transmit the engine rotational torque to the main rotor through a plurality of gear trains, without complicating the structure of the helicopter power transmitting apparatus.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A helicopter power transmitting apparatus for rotating a main rotor by a power inputted from an engine comprising:

an input shaft for receiving said power for turning thereof;

an outer sleeve inserted in an outside of said input shaft for being slidable in an axial direction;

a first small helical gear formed on an outer periphery of an end of said outer sleeve;

a second small helical gear with a traverse helical angle to that of said first small helical gear formed on another end of said outer sleeve;

a pair of small shafts provided in parallel with said input shaft;

a first large helical gear formed on an end of said one of said small shafts and meshed with said first small helical gear;

a second large helical gear formed on another one of said small shafts and meshed with said second small helical gear;

a first small gear formed on another end of said one of said small shafts;

a second small gear with the same number of teeth as said first small gear formed on another end of another one of said small shafts;

a large gear formed on a driving shaft and meshed with said first and second small gears for rotating said main rotor; and said pair of small shafts are formed so as to have the same bending deformation and to avoid movement thereof in said axial direction due to manufacturing allowances and distortions of components when an uneven heavy load is applied thereto, when the load exerted on said input shaft and said outer sleeve becomes bigger than that causing locking state between said input shaft and said outer sleeve.

2. A helicopter power transmitting apparatus for rotating a main rotor by a power inputted from an engine, comprising:

an input shaft for receiving said power for turning thereof;

an outer sleeve inserted in an outside of said input shaft for being slidable in an axial direction;

a first small helical gear formed on an outer periphery of an end of said outer sleeve;

a second small helical gear formed on an outer periphery of an end of said outer sleeve;

a pair of small shafts provided in parallel with said input shaft;

a first large helical gear formed on an end of said one of said small shafts and meshed with said first small helical gear;

a second larger helical gear formed on another end of another one of said small shafts and meshed with said second small helical gear;

a first small gear formed on another end of said one of said small shafts;

a second small gear with the same number of teeth as said first small gear formed on another end of another one of said small shafts;

a large gear formed on a driving shaft and meshed with said first and second small gears for rotating said main rotor; and one of said pair of small shafts is formed so as to have a greater bending rigidity than that of another one of said pair of small shafts and to avoid a movement thereof in said axial direction due to manufacturing allowances and distortions of components when an uneven heavy load is applied thereto, when the load exerted on said input shaft and said outer sleeve becomes bigger than that causing locking state between said input shaft and said outer sleeve.

3. The helicopter power transmitting apparatus according to claim 1, wherein:

said input shaft and said outer sleeve are mechanically connected with a spline formed on each of outer and inner surfaces thereof respectively so as to be easily and smoothly movable in said axial direction.

4. The helicopter power transmitting apparatus according to claim 2, wherein:

said input shaft and said outer sleeve are mechanically connected with a spline formed on an outer surface of said input shaft so as to be easily and smoothly movable in said axial direction.

5. A helicopter power transmitting apparatus for rotating a main rotor by a power inputted from an engine, comprising:

an input shaft for receiving said power for turning thereof;

a slidable joint permanently connected to an end of said input shaft;

a slidable shaft mounted on a recessed end portion of said slidable joint;

a first small helical gear formed on an outer and lower periphery of an end of said slidable shaft;

a second small helical gear formed on another end of said slidable shaft;

a pair of small shafts provided in parallel with said input shaft;

a first large helical gear formed on an end of said one of said small shafts and meshed with said first small helical gear;

a second large helical gear formed on another end of said small shafts and meshed with said second small helical gear;

a first small gear formed on another end of said one of said small shafts;

a second small gear with the same number of teeth as said first small gear formed on another end of another one of said small shafts;

a large gear formed on a driving shaft and meshed with said first and second small gears for rotating said main rotor; and said pair of small shafts are formed so as to have the same bending deformation and to avoid movement thereof in an axial direction due to manufacturing allowances and distortions of components when an uneven heavy load is applied thereto, when the load exerted on said slidable joint and said slidable shaft becomes bigger than that causing locking state between said slidable joint and said slidable shaft.

6. The helicopter power transmitting apparatus according to claim 5, wherein:

said slidable shaft has characteristics of a torsional resilient rigidity so as to equalize a phase difference between those of said small gears when said uneven heavy load is applied thereto.

7. The helicopter power transmitting apparatus according to claim 5, wherein:

said slidable joint and slidable shaft are mechanically connected with a spline formed on an outer surface of said slidable shaft so as to be easily and smoothly movable in said axial direction.

8. A helicopter power transmitting apparatus for rotating a main rotor by a power inputted from an engine, comprising:

an input shaft for receiving said power for turning thereof;

a slidable joint permanently connected to an end of said input shaft;

a slidable shaft suspended under a recessed end portion of said slidable joint;

a first small helical gear formed on an outer and lower periphery of an end of said slidable shaft;

a second small helical gear formed on an outer and lower periphery of an end of said slidable shaft;

a pair of small shafts provided in parallel with said input shaft;

a first large helical gear formed on an end said one of said small shafts and meshed with said first small helical gear;

a second large helical gear formed on another end of another one of said small shafts and meshed with said second small helical gear;

a first small gear formed on another end of said one of said small shafts;

a second small gear with the same number of teeth as said first small gear formed on another end of another one of said small shafts;

a large gear formed on a driving shafts and meshed with said first and second small gears for rotating said main rotor; and said pair of small shafts are formed so as to have the same bending deformation and to avoid movement thereof in said axial direction due to manufacturing allowances and directions of components when an uneven heavy load is applied thereto, when the load exerted on said slidable joint and slidable shaft becomes bigger than that causing locking state between said slidable joint and said slidable shaft.

9. The helicopter power transmitting apparatus according to claim 8, wherein:

said pair of small shafts have such flexural rigidity relationship as to substantially eliminate a phase difference between said first and second small gears, against unbalanced forces applied to said pair of small shafts, respectively when said first and second small gears transmit the same torque to said large gear, and further said slidable shaft has such torsional rigidity as to substantially eliminate the phase difference between said first and second small gears when said first and second small gears transmit the same torque to said large gear.

10. The helicopter power transmitting apparatus according to claim 8, wherein:

said slidable joint and slidable shaft are mechanically connected with a spline formed on an outer surface of said slidable shaft respectively so as to be easily and smoothly movable in said axial direction.

* * * * *